(12) United States Patent
West

(10) Patent No.: US 6,822,151 B2
(45) Date of Patent: Nov. 23, 2004

(54) MUSICAL INSTRUMENT TEACHING DEVICE AND METHOD THEREFOR

(76) Inventor: Glen West, 15627 N. 59th La., Glendale, AZ (US) 85306

( * ) Notice: Subject to any disclaimer, the term of this patent is extended or adjusted under 35 U.S.C. 154(b) by 0 days.

(21) Appl. No.: 10/325,764

(22) Filed: Dec. 19, 2002

(65) Prior Publication Data

US 2003/0116007 A1 Jun. 26, 2003

Related U.S. Application Data

(60) Provisional application No. 60/342,252, filed on Dec. 21, 2001.

(51) Int. Cl.$^7$ .............................................. G09B 15/00
(52) U.S. Cl. .................. 84/470 R; 84/477 R; 84/483.1; 84/453
(58) Field of Search ........................... 84/470 R, 477 R, 84/483.1, 453

(56) References Cited

U.S. PATENT DOCUMENTS 5,015,319 A * 5/1991 Wilen .......................... 156/227
5,764,597 A * 6/1998 Shih ............................ 368/29

* cited by examiner

Primary Examiner—Shih-Yung Hsieh
(74) Attorney, Agent, or Firm—Jeffrey D. Moy; Harry M. Weiss; Weiss, Moy & Harris, P.C.

(57) ABSTRACT

A musical instrument teaching calender has a plurality of pages coupled together. A date section is located on each of the plurality of pages for indicating the day of the year. A musical instruction section is located on each of the plurality of pages for teaching a musical lesson.

13 Claims, 5 Drawing Sheets

FIG. 2

MUSICAL INSTRUMENT TEACHING DEVICE AND METHOD THEREFOR

RELATED APPLICATIONS

This patent application is claiming the benefit of the U.S. Provisional Application having an application No. of 60/342,252, filed Dec. 21, 2001, in the name of Glen West, and entitled "A MUSICAL INSTRUMENT TEACHING DEVICE AND METHOD THEREFOR".

BACKGROUND OF THE INVENTION

1. Field of the Invention

This invention relates to musical instruments and, more specifically, to an apparatus and method for musical instrument instructions.

2. Description of the Prior Art

Many individuals would like to learn how to play a musical instrument. The problem is that most people just don't know where to begin. Many people do not want to spend a lot of time and money taking private music lessons. Group lessons also take up a lot of time and money. Furthermore, in a group setting, many individuals just don't receive a sufficient amount of attention to learn how to properly play an instrument.

Because of the above problems, many people have turned to self help books to learn how to play an instrument. The problem with most music instruction books are that they are too complex to follow. Furthermore, many people are not disciplined enough to follow the instructions in the book.

Therefore, a need existed to provide an improved apparatus and method for teaching musical instruction. The improved apparatus and method for teaching musical instruction must be an inexpensive alternative to private and group music lessons. The improved apparatus and method for teaching musical instruction must provide simple step by step instructions on how to play a musical instrument.

SUMMARY OF THE INVENTION

In accordance with one embodiment of the present invention, it is an object of the present invention to provide an improved apparatus and method for teaching musical instruction.

It is another object of the present invention to provide an improved apparatus and method for teaching musical instruction and presenting various musical information.

It is still another object of the present invention to provide an improved apparatus and method for teaching musical instruction that is an inexpensive alternative to private and group music lessons.

It is yet another object of the present invention to provide an improved apparatus and method for teaching musical instruction that provides simple step by step instructions on how to play a musical instrument.

It is a further object of the present invention to provide an improved apparatus and method for teaching musical instruction that provides daily instructions in the form of a 365 day page a day calendar presenting small and manageable amounts of information for daily study.

BRIEF DESCRIPTION OF THE EMBODIMENTS

In accordance with one embodiment of the present invention, a musical instrument teaching calender is disclosed. The musical instrument teaching calender has a plurality of pages coupled together. A date section is located on each of the plurality of pages for indicating the day of the year. A musical instruction section is located on each of the plurality of pages for teaching a musical lesson.

In accordance with another embodiment of the present invention, a musical instrument teaching calender is disclosed. The musical instrument teaching calender has a plurality of pages coupled together. A date section is located on each of the plurality of pages for indicating the day of the year. A musical instruction section is located on each of the plurality of pages for teaching a musical lesson. The musical instruction section has an explanatory text section for explaining the musical lesson in a text format. A visual teaching section is also provided for visually showing the musical lesson. A standard music notation section is provided for those who know how to read music. A tablature area is also provided for using visual cues to indicate how the musical instrument is played.

The foregoing and other objects, features, and advantages of the invention will be apparent from the following, more particular, description of the preferred embodiments of the invention, as illustrated in the accompanying drawing.

BRIEF DESCRIPTION OF THE DRAWINGS

The invention itself, as well as a preferred mode of use, and advantages thereof, will best be understood by reference to the following detailed description of illustrated embodiment when read in conjunction with the accompanying drawings, wherein like reference numerals and symbols represent like elements.

FIG. 2 is a front view of one page of another embodiment of the music instruction calendar of the present invention.

DETAILED DESCRIPTION OF THE PREFERRED EMBODIMENT

Figure 1:
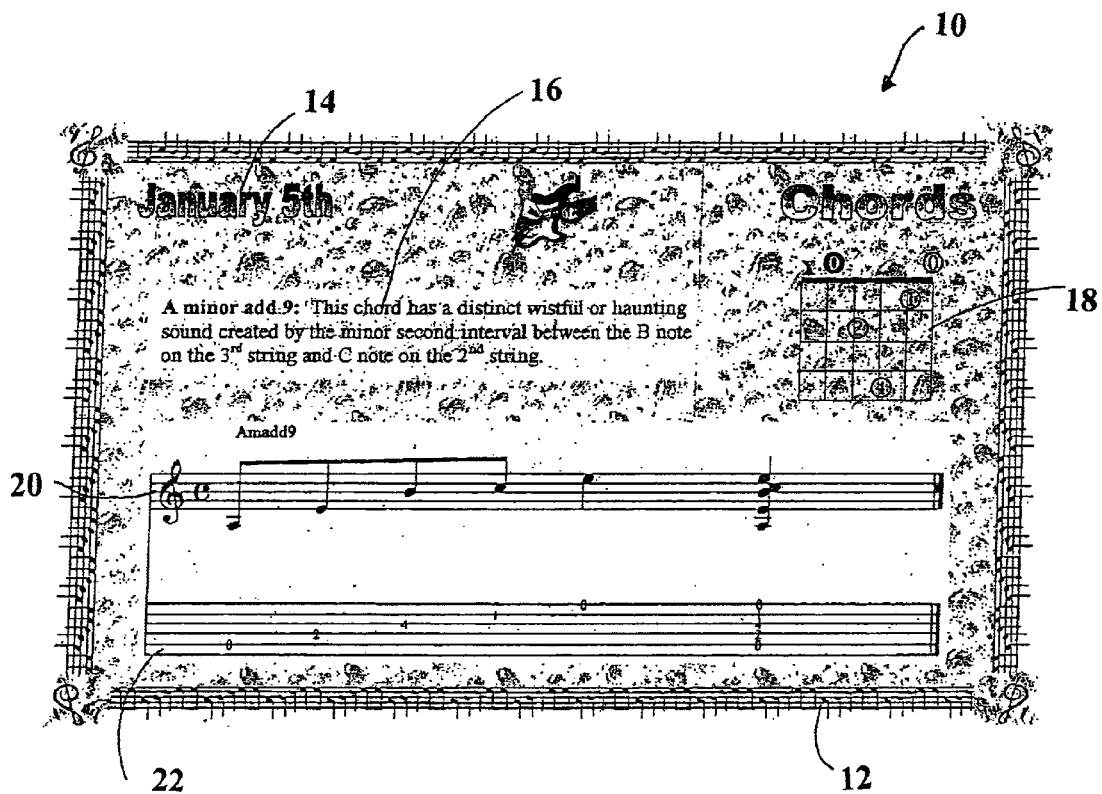
FIG. 1 is a front view of one page of one embodiment of the music instruction calendar of the present invention.

Referring to FIG. 1, one page of one embodiment of the music instruction calendar 10 (hereinafter calendar 10) of the present invention is shown. The calendar 10 is designed to teach any type of musical instrument instruction. The calendar 10 is further designed so that each day a different music lesson is taught.

The calendar 10 is divided up into a plurality of different pages 12. Each page 12 will correspond to a particular day of the year. The page 12 will have a date section 14. The date section 14 will list the particular day of the year. Each page 12 will further have a explanatory text section 16. The explanatory text section 16 will explain the present day's music lesson in a written format. For example, in FIG. 1, the explanatory text section 16 will display written text for a guitar lesson. The explanatory text section 16 will describe a particular lesson which is to be learned. The lesson may include, but is not limited to, teaching a chord/note, riff, etc. The explanatory text section 16 may further describe the sound of the particular chord/note, riff, etc. The explanatory text section 16 will provide written instructions on how to play the particular chord/note, riff, etc.. It should be noted that the explanatory text section 16 may describe written instructions for any type of instrument. The description of a guitar should not be seen as to limit the scope of the present invention.

Since many individuals are more capable of learning how to play a musical instrument by sight rather than by reading, the calendar 10 will provide several visual means for teaching individuals how to play a musical instrument. As may be seen in FIG. 1, the page 12 may have a neck graph 18. The neck graph 18 is a visual means of showing which fingers need to be placed on which strings of a guitar and on which area of the neck of the guitar in order to play a particular chord. The neck graph 18 may include a six string neck graph, a five string neck graph, and/or a four string neck graph.

Figure 3:
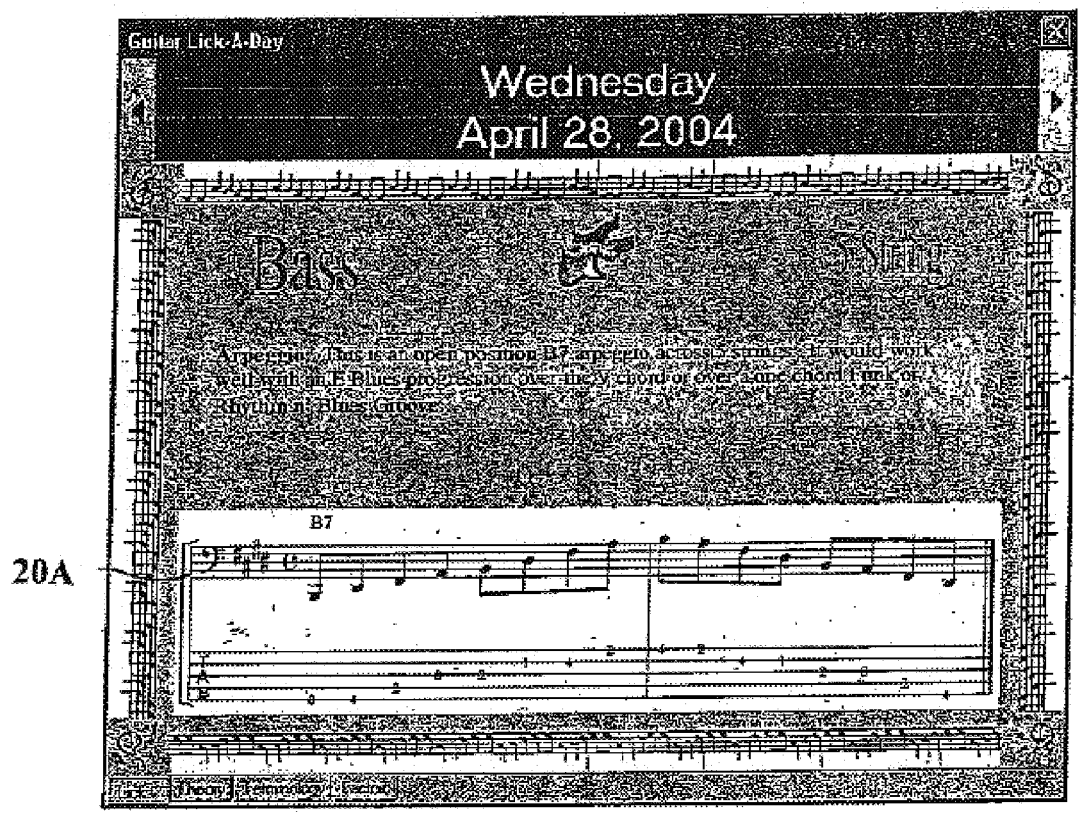
FIG. 3 is a front view of one page of another embodiment of the music calendar of the present invention.
Figure 4:
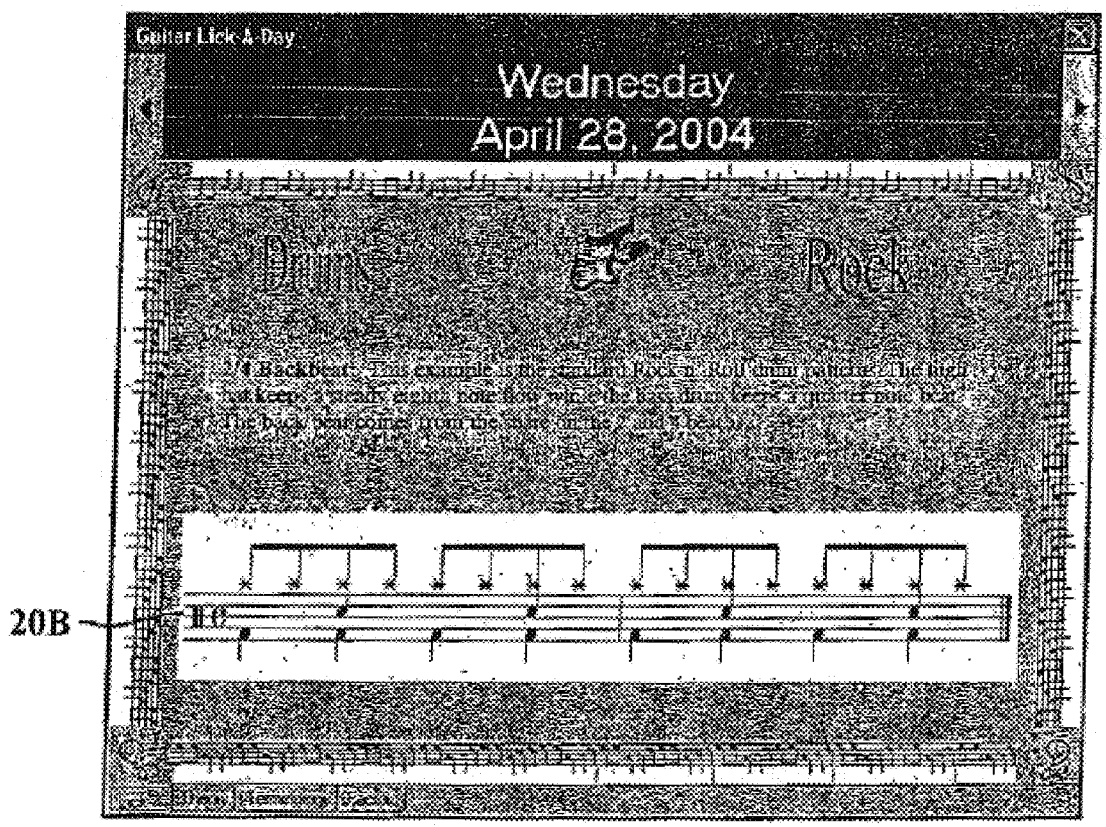
FIG. 4 is a front view of one page of another embodiment of the music calendar of the present invention.

The calendar 10 will also have an area for displaying a standard music notation 20. The standard music notation 20 will display a standard five line music notational staff. The standard music notation 20 may display a treble clef, a bass clef 20A (FIG. 3) and/or a drum clef 20B (FIG. 4). The standard music notation 20 is generally used by those who already know how to read music. However, the standard music notation 20 may be used with the explanatory text section 16 to help an individual learn how to read and understand a standard five line musical notational staff.

Located below the standard music notation 20 is a tablature area 22. Tablature is a system of notation using letters, symbols, or other visual cues instead of standard notation to indicate how a musical instrument is to be played. For example, guitar or banjo tablature typically consists of a diagram of the strings with finger positions indicated by numerals corresponding to the appropriate frets. The tablature area 22 for teaching guitar lessons may include six string, five string and/or a four string notation.

Figure 2:
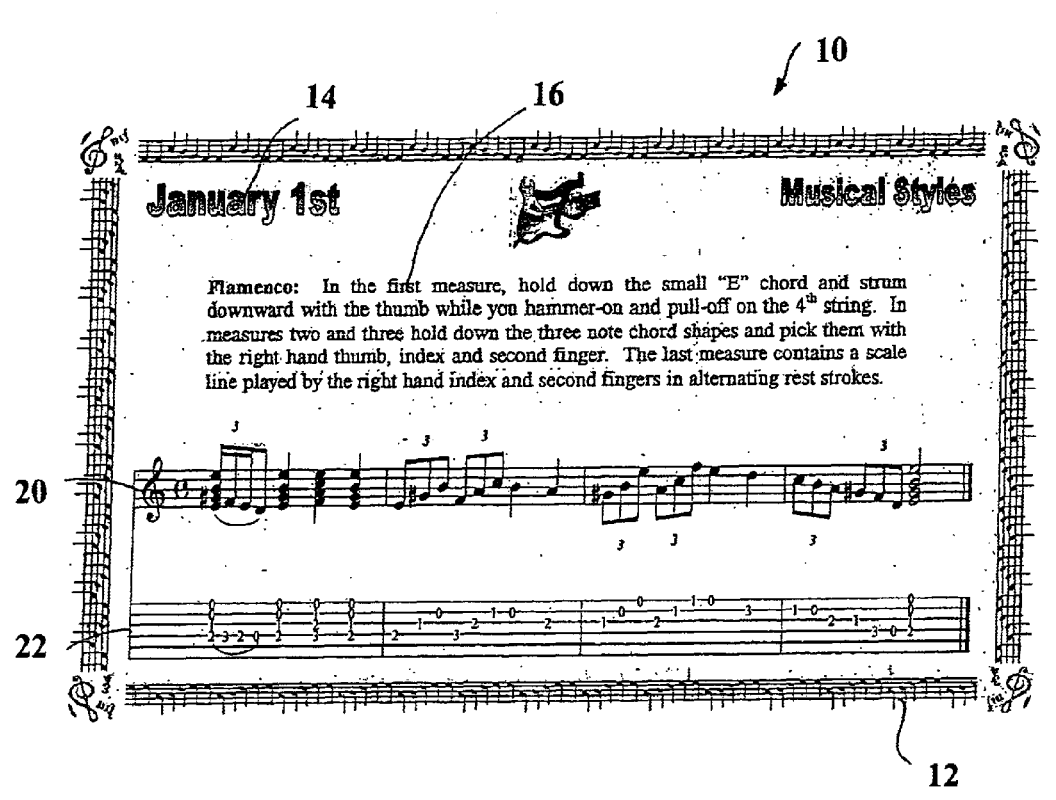

Referring now to FIG. 2, another embodiment of the calendar 10 is shown. In this embodiment, the page 12 is similar to that shown in FIG. 1. The main difference is that the embodiment depicted in FIG. 2 is teaching a musical style instead of a particular chord/note. A calendar 10 may include pages 12 incorporating both embodiments.

Figure 5:
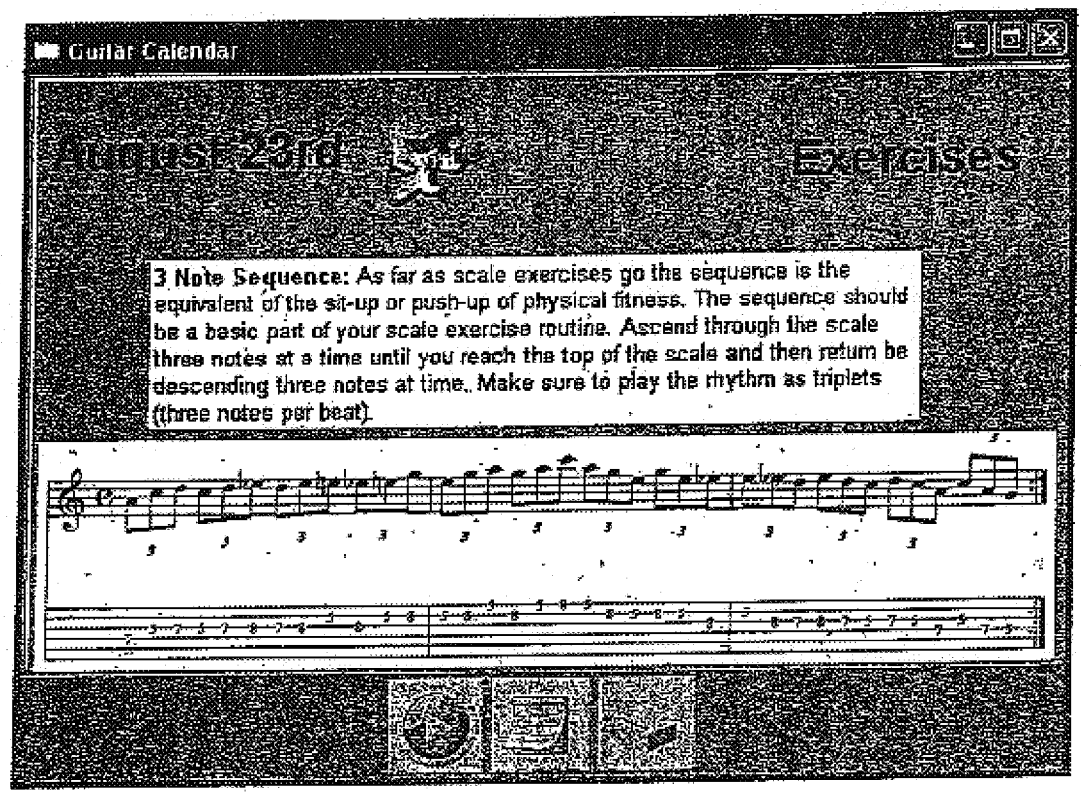
FIG. 5 is a front view of an electronic page of the music calendar of the present invention.

The above calendar 10 may be implemented in hard form such as a written desk calendar. Alternatively, the calendar 10 may be implemented in an electronic version such as a computer program as shown in FIG. 5. The computer program would provide daily lessons on the computer screen. The screen would show the page 12 as described above. The screen may also display a video lesson on what was just presented on the page 12.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A musical instrument teaching calender comprising, in combination:

a plurality of pages coupled together;

a date section on each of the plurality of pages for indicating the day of the year; and a musical instruction section on each of the plurality of pages for teaching a musical lesson.

2. A musical instrument teaching calender in accordance with claim 1 wherein the musical instruction section comprises an explanatory text section for explaining the musical lesson in a text format.

3. A musical instrument teaching calender in accordance with claim 1 wherein the musical instruction section comprises a visual teaching section for visually showing the musical lesson.

4. A musical instrument teaching calender in accordance with claim 3 wherein the visual teaching section is a neck graph.

5. A musical instrument teaching calender in accordance with claim 4 wherein the neck graph is a six string neck graph.

6. A musical instrument teaching calender in accordance with claim 1 wherein the musical instruction section comprises a standard music notation section.

7. A musical instrument teaching calender in accordance with claim 6 wherein the musical instruction section further comprises a tablature area for using visual cues to indicate how the musical instrument is played.

8. A musical instrument teaching calender in accordance with claim 6 wherein the standard music notation section displays a standard five line music notational staff.

9. A musical instrument teaching calender in accordance with claim 6 wherein the standard music notation section displays a treble clef.

10. A musical instrument teaching calender in accordance with claim 6 wherein the standard music notation section displays a bass clef.

11. A musical instrument teaching calender in accordance with claim 6 wherein the standard music notation section displays a drum clef.

12. A musical instrument teaching calender in accordance with claim 1 wherein the musical instruction section teaches a musical style.

13. A musical instrument teaching calender in accordance with claim 1 wherein the musical instrument teaching calender is implemented into an electronic media.

* * * * *